United States Patent
Huang et al.

(10) Patent No.: US 10,496,184 B2
(45) Date of Patent: Dec. 3, 2019

(54) OPTICAL NAVIGATION DEVICE AND LOCUS SMOOTHING METHOD THEREOF

(71) Applicant: PixArt Imaging Inc., Hsin-Chu County (TW)

(72) Inventors: Yu-Hao Huang, Hsin-Chu (TW); Ming-Tsan Kao, Hsin-Chu (TW); Sen-Huang Huang, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 16/047,338

(22) Filed: Jul. 27, 2018

(65) Prior Publication Data

US 2018/0335854 A1    Nov. 22, 2018

Related U.S. Application Data

(63) Continuation of application No. 15/217,701, filed on Jul. 22, 2016, now Pat. No. 10,082,883, which is a continuation of application No. 13/871,321, filed on Apr. 26, 2013, now abandoned.

(30) Foreign Application Priority Data

May 1, 2012    (TW) .............................. 101115438 A

(51) Int. Cl.
*G06F 3/03*    (2006.01)
*G06F 3/0354*    (2013.01)
*G06F 3/038*    (2013.01)

(52) U.S. Cl.
CPC ............ *G06F 3/0317* (2013.01); *G06F 3/038* (2013.01); *G06F 3/03541* (2013.01); *G06F 3/03543* (2013.01)

(58) Field of Classification Search
CPC .... G06F 3/0317; G06F 3/03541; G06F 3/038; G06F 3/03543
See application file for complete search history.

(56) References Cited

U.S. PATENT DOCUMENTS

| | | | |
|---|---|---|---|
| 2003/0020688 A1* | 1/2003 | Norskog | G06F 1/32 345/158 |
| 2005/0146503 A1* | 7/2005 | Lin | G06F 3/0317 345/163 |
| 2010/0103191 A1* | 4/2010 | Chen | G06F 3/0317 345/611 |

* cited by examiner

*Primary Examiner* — Brent D Castiaux
(74) *Attorney, Agent, or Firm* — WPAT, PC

(57) ABSTRACT

There is provided an optical navigation device including an image sensor, a processing unit, a storage unit and an output unit. The image sensor is configured to successively capture images. The processing unit is configured to calculate a current displacement according to the images and to compare the current displacement or an accumulated displacement with a threshold so as to determine an outputted displacement. The storage unit is configured to save the accumulated displacement. The output unit is configured to output the outputted displacement with a report rate.

20 Claims, 4 Drawing Sheets

OPTICAL NAVIGATION DEVICE AND LOCUS SMOOTHING METHOD THEREOF

CROSS REFERENCE TO RELATED APPLICATION

This application is a continuation application of U.S. application Ser. No. 15/217,701, filed on Jul. 22, 2016, which is a continuation application of U.S. application Ser. No. 13/871,321, filed on Apr. 26, 2013 and claims the priority benefit of Taiwan Patent Application Serial Number 101115438, filed on May 1, 2012, the full disclosure of which is incorporated herein by reference.

BACKGROUND

1. Field of the Disclosure

This disclosure generally relates to a human machine interface device and, more particularly, to an optical navigation device and a locus smoothing method thereof capable of increasing locus smoothness.

2. Description of the Related Art

Traditionally, the optical mouse is one of the peripheral devices for interacting with the computer system having a display screen. An optical mouse generally includes a light source, an image sensor and a processing unit. The light source emits light to a working surface. The image sensor receives reflected light from the working surface and successively outputs image frames. The processing unit calculates a displacement of the optical mouse with respect to the working surface according to the image frames and sends the displacement to a computer system with a report rate for corresponding control.

However, as the image frames captured by the image sensor may contain noise, the noise will reflect in the displacement calculated by the processing unit. Although the displacement will not be obviously affected by a position offset caused by the noise when the displacement is relatively larger than the position offset, when the displacement is very small and is substantially identical to or just a little bit larger than the position offset, the locus can be disturbed to have a zigzag path.

For example referring to FIG. 1, it shows a schematic diagram of the locus outputted by a conventional optical mouse, wherein it is assumed that the optical mouse outputs the detected displacement with report rate of 125 times/second. For example, now a user slowly moves the optical mouse along an X direction. When there is no noise in the image frame, the optical mouse can output the locus of a straight line as shown by the dashed line. However, when there is noise in the image frame, such as +Δy noise existing at 16 ms and 56 ms and −Δy noise existing at 24 ms and 48 ms, the optical mouse will output the locus having a zigzag path. This zigzag locus can significantly affect the operation of a user in fine operation.

Accordingly, the present disclosure further provides an optical navigation device and a locus smoothing method thereof that can effectively eliminate or significantly reduce the zigzag locus outputted by a conventional optical mouse.

SUMMARY

The present disclosure provides an optical navigation device and a locus smoothing method thereof that may output a zero displacement when an accumulated displacement does not exceed a displacement threshold or an accumulated parameter does not exceed a predetermined accumulation value thereby eliminating the noise interference.

The present disclosure provides an optical navigation device including an image sensor, an output unit and a processing unit. The image sensor is configured to successively capture images. The processing unit is coupled to the output unit and configured to calculate a current displacement according to the captured images and compare the current displacement with a threshold. When the current displacement is smaller than the threshold, the processing unit outputs a zero displacement to the external electronic device via the output unit and accumulates the current displacement to an accumulated displacement. When the current displacement is larger than or equal to the threshold, the processing unit outputs the current displacement without accumulating the current displacement to the accumulated displacement.

The present disclosure further provides a locus smoothing method of an optical navigation device for smoothing displacements sent to an external electronic device. The optical navigation device includes an image sensor, an output unit and a processing unit. The locus smoothing method includes the steps of: successively capturing, by the image sensor, images; calculating, by the processing unit, a current displacement according to the captured images; comparing, by the processing unit, the current displacement with a threshold; when the current displacement is smaller than the threshold, accumulating the current displacement to an accumulated displacement, calculating, by the processing unit, a next current displacement, and directly accumulating the next current displacement to the accumulated displacement; outputting the accumulated displacement to the external electronic device via the output unit when the accumulated displacement is larger than or equal to the threshold; and outputting a zero displacement to the external electronic device via the output unit when the accumulated displacement is smaller than the threshold.

The present disclosure further provides a locus smoothing method of an optical navigation device for smoothing displacements sent to an external electronic device. The optical navigation device includes an image sensor, an output unit and a processing unit. The locus smoothing method includes the steps of: successively capturing, by the image sensor, images; calculating, by the processing unit, a current displacement according to the captured images; comparing, by the processing unit, the current displacement with a threshold; outputting the current displacement when the current displacement is larger than or equal to the threshold; and accumulating the current displacement to the accumulated displacement and outputting a zero displacement to the external electronic device via the output unit when the current displacement is smaller than the threshold.

In the optical navigation device and the locus smoothing method according to the embodiment of the present disclosure, when an accumulated parameter counted by a counting unit is larger than or equal to a predetermined accumulation value, the accumulated displacement or an average displacement of the accumulated displacement is outputted so as to avoid accumulating the displacement for a long time.

In the optical navigation device and the locus smoothing method according to the embodiment of the present disclosure, when a current displacement is smaller than the threshold, the processing unit may directly accumulate the obtained next current displacement to the accumulated displacement and does not compare the next current displacement with the threshold. When the accumulated displacement is larger than or equal to the threshold, the accumulated displacement is outputted for one time or an average displacement of the accumulated displacement is outputted for several times, wherein an output time of outputting the average displacement may be determined according to the accumulated parameter, which may be an accumulated number of the current displacement being accumulated or an accumulation interval of accumulating the current displacement. When the accumulated displacement is smaller than the threshold, a zero displacement may be outputted.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
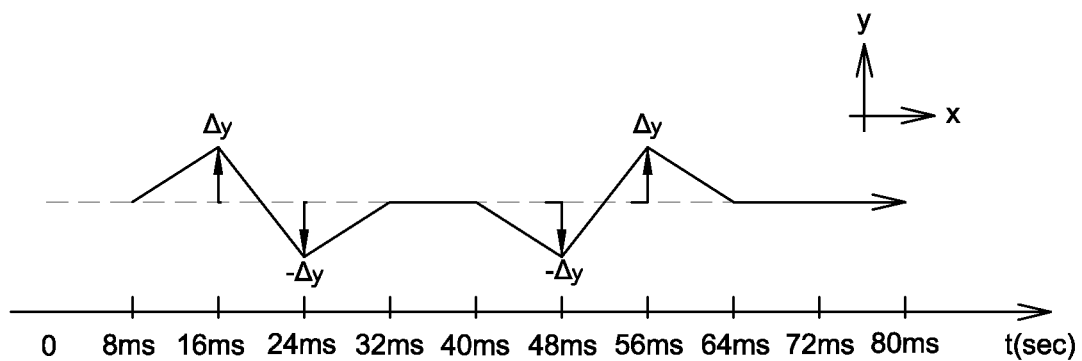
FIG. 1 shows a schematic diagram of the locus outputted by a conventional optical mouse.
Figure 2A:
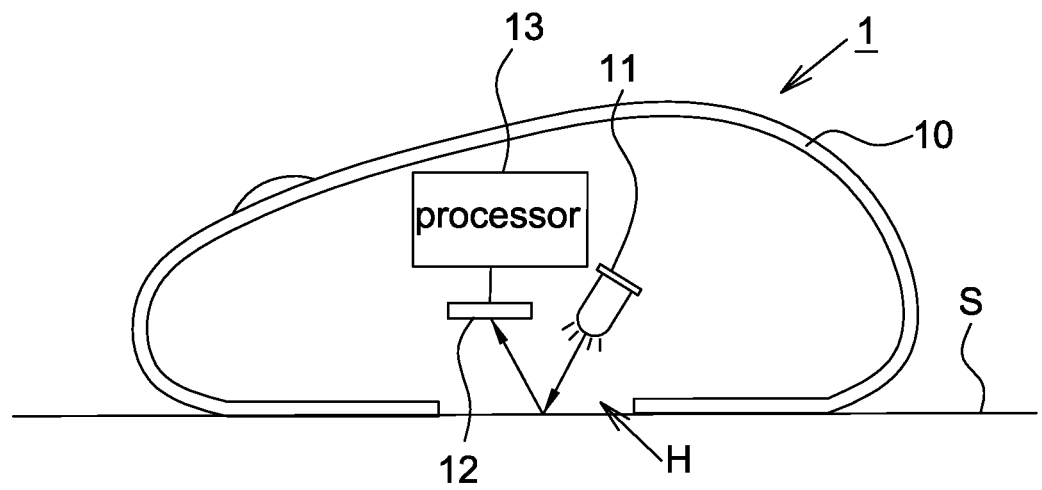
FIG. 2A shows a schematic diagram of the optical navigation device according to an embodiment of the present disclosure.
Figure 2B:
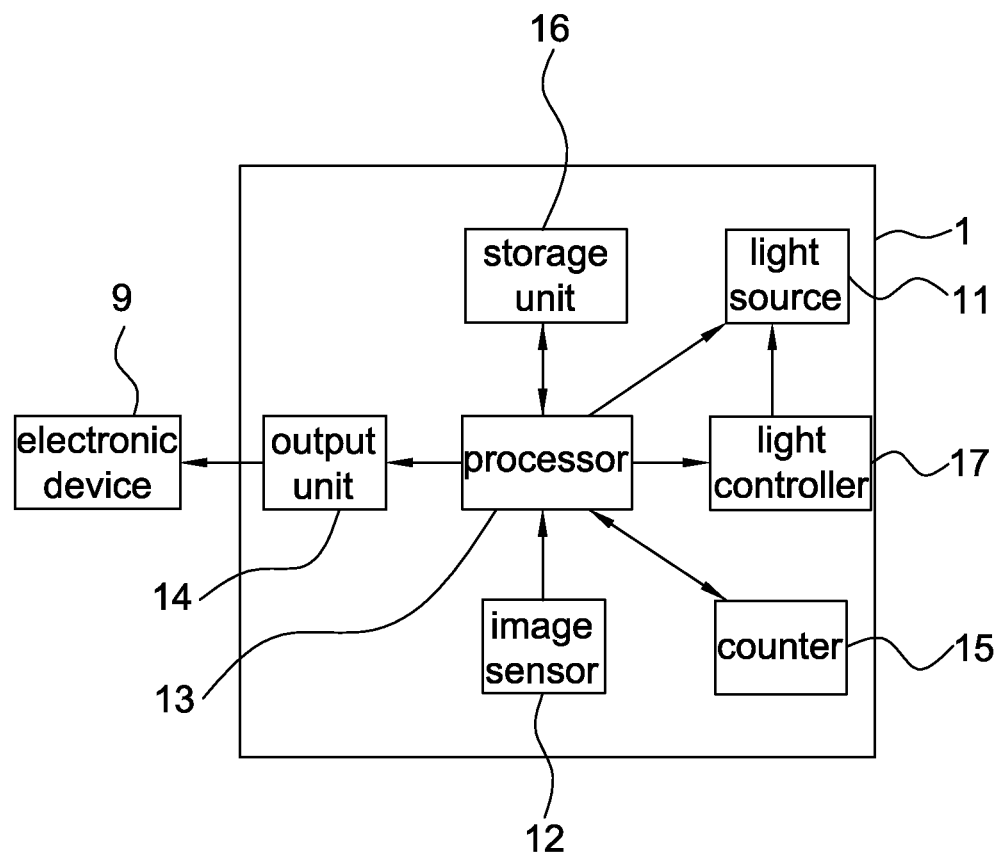
FIG. 2B shows a schematic block diagram of the optical navigation device according to an embodiment of the present disclosure.

Referring to FIGS. 2A and 2B, FIG. 2A shows a schematic diagram of the optical navigation device according to an embodiment of the present disclosure; and FIG. 2B shows a schematic block diagram of the optical navigation device according to an embodiment of the present disclosure.

The optical navigation device 1 includes a housing 10, a light source 11, an image sensor 12, a processing unit 13, an output unit 14, a counting unit 15 and a storage unit 16. In one embodiment, the optical navigation device 1 may further include a light control unit 17 configured to control the turning on and the turning off of the light source 11, and the light control unit 17 may be included in the processing unit 13 or separated therefrom. The optical navigation device 1 is configured to be put on a working surface S for being operated by a user.

A bottom surface of the housing 10 has an opening H. The light source 11 may be a light emitting diode, a laser diode or other active light sources and preferably is configured to irradiate red light or invisible light to illuminate the working surface S through the opening H.

The image sensor 12 may be a CCD image sensor, a CMOS image sensor or other sensors capable of detecting light energy. The image sensor 12 receives reflected light reflected from the working surface S and passing through the opening H at a sampling frequency to successively capture and output images.

The processing unit 13 may be a digital signal processor (DSP). After receiving the images sent from the image sensor 12, the processing unit 13 calculates a current displacement according to the images, compares the current displacement or an accumulated displacement with a threshold so as to determine and output an outputted displacement. In one embodiment, when the processing unit 13 identifies that the current displacement is larger than or equal to the threshold, the processing unit 13 controls the output unit 14 to output the current displacement; that is, the outputted displacement is the current displacement. When the processing unit 13 identifies that the current displacement is smaller than the threshold, the current displacement is accumulated to an accumulated displacement and then stored in the storage unit 16; meanwhile, the processing unit 13 controls the output unit 14 to output a zero displacement (i.e. the outputted displacement is 0) and directly accumulates a next current displacement to the accumulated displacement. At this moment, the processing unit 13 may or may not compare the next current displacement with the threshold. Then, when the processing unit 13 identifies that the accumulated displacement is larger than or equal to the threshold or identifies that an accumulated parameter is larger than or equal to a predetermined accumulation value (described later), the processing unit 13 may further calculate an average displacement of the accumulated displacement and control the output unit 14 to output the accumulated displacement for one time or to output the average displacement for several times; that is, the outputted displacement may be the accumulated displacement or the average displacement. It should be mentioned that if the accumulated displacement is outputted by the processing unit 13, the average displacement may not be calculated. When the processing unit 13 identifies that the accumulated displacement is smaller than the threshold and the accumulated parameter is smaller than the predetermined accumulation value, the processing unit 13 controls the output unit 14 to output a zero displacement; that is, the outputted displacement is 0.

The output unit 14 wired or wirelessly sends the outputted displacement to an electronic device 9 at a fixed report rate, e.g. 120 times/second or 125 times/second so as to perform corresponding control, wherein the method of an optical navigation device controlling an electronic device is well known to the art, e.g. controlling a cursor or an application using an optical mouse, and thus details thereof are not described herein. The present disclosure is to smooth the outputted displacement of the optical navigation device 1. In addition, the report rate mentioned above is only exemplary and is not used to limit the present disclosure.

The counting unit 15 is configured to count an accumulated parameter, e.g. counting an accumulated number of the current displacement being accumulated or an accumulation interval of accumulating the current displacement so as to avoid a long accumulation interval or a high accumulated number of the current displacement that could affect the operation of the user. Therefore in this embodiment, the processing unit 13 may further compare the accumulated parameter with a predetermined accumulation value. When the accumulated parameter is identified to be larger than or equal to the predetermined accumulation value, the processing unit 13 may further calculate an average displacement of the accumulated displacement and control the output unit 14 to output the accumulated displacement for one time or to output the average displacement for several times, wherein an output time of the output unit 14 outputting the average displacement may be determined according to the accumulated parameter, e.g. the output time may be equal to the accumulated number (described later with an example). As mentioned above, if the accumulated displacement is outputted by the processing unit 13, the average displacement may not be calculated.

The storage unit 16 is configured to store the threshold, accumulated displacement, accumulated parameter and/or predetermined accumulation value.

Figure 3:
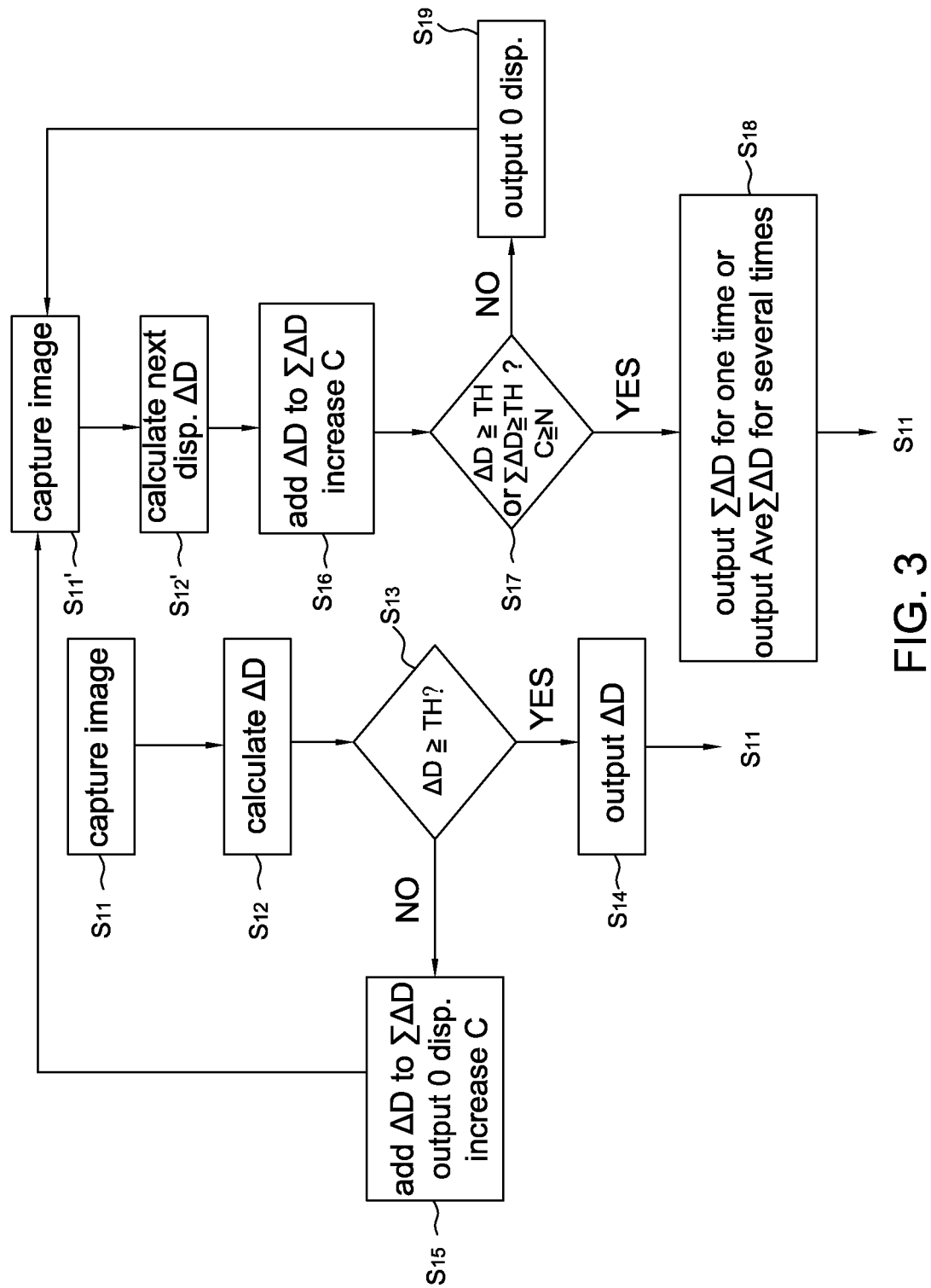
FIG. 3 shows a flow chart of the locus smoothing method of the optical navigation device according to an embodiment of the present disclosure.

Referring to FIG. 3, it shows a flow chart of the locus smoothing method of an optical navigation device according to an embodiment of the present disclosure including the steps of: successively capturing images (Step $S_{11}$); calculating a current displacement $\Delta D$ according to the images (Step $S_{12}$); comparing the current displacement $\Delta D$ with a threshold TH (Step $S_{13}$); outputting the current displacement $\Delta D$ when the current displacement $\Delta D$ is larger than or equal to the threshold TH (Step $S_{14}$); when the current displacement $\Delta D$ is smaller than the threshold TH, accumulating the current displacement $\Delta D$ to an accumulated displacement $\Sigma\Delta D$, counting an accumulated parameter C and outputting a zero displacement (Step $S_{15}$); successively capturing images (Step $S_{11}$'); calculating a next current displacement $\Delta D$ (Step $S_{12}$'); directly accumulating the next current displacement $\Delta D$ to the accumulated displacement $\Sigma\Delta D$ and counting the accumulated parameter C (Step $S_{16}$); comparing the next current displacement $\Delta D$ or the accumulated displacement $\Sigma\Delta D$ with the threshold TH and comparing the accumulated parameter C with a predetermined accumulation value N (Step $S_{17}$); when the accumulated displacement $\Sigma\Delta D$ or the next current displacement $\Delta D$ is larger than or equal to the threshold TH or when the accumulated parameter C is larger than or equal to the predetermined accumulation value N, outputting the accumulated displacement $\Sigma\Delta D$ for one time or outputting an average displacement $Ave\Sigma\Delta D$ of the accumulated displacement $\Sigma\Delta D$ for several times (Step $S_{18}$); when the accumulated displacement $\Sigma\Delta D$ and the next current displacement $\Delta D$ are both smaller than the threshold TH and the accumulated parameter C is smaller than the predetermined accumulation value N, outputting a zero displacement (Step $S_{19}$).

Figure 4:
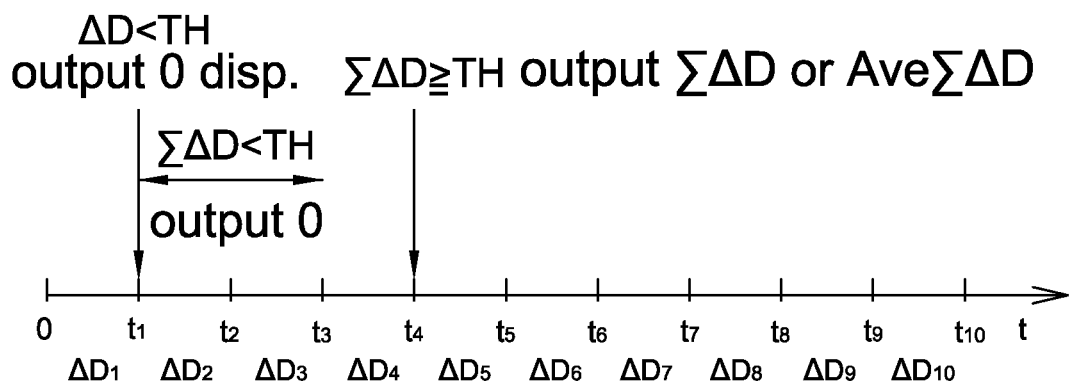
FIG. 4 shows an operational schematic diagram of the locus smoothing method of the optical navigation device according to the embodiment of the present disclosure.

Referring to FIGS. 3 and 4, the locus smoothing method of the optical navigation device according to an embodiment of the present disclosure will be described hereinafter using an example.

Step $S_{11}$:

The image sensor 12 successively captures images at a sampling frequency. At this moment, the accumulated displacement $\Sigma\Delta D$ saved in the storage unit 16 is equal to zero; i.e. $\Sigma\Delta D=0$.

Step $S_{12}$:

For example at time $t_1$, the processing unit 13 receives the images to accordingly calculate a current displacement $\Delta D$.

Step $S_{13}$:

The processing unit 13 compares the current displacement $\Delta D$ with a threshold TH so as to determine the current displacement $\Delta D$ is outputted or accumulated.

Step $S_{14}$:

When the current displacement $\Delta D$ is larger than or equal to the threshold TH, the processing unit 13 outputs the current displacement $\Delta D$ to the output unit 14 so as to transmit the current displacement $\Delta D$ to an external electronic device 9 through the output unit 14. The procedure returns to the Step $S_{11}$ to perform a next detection of displacement.

Step $S_{15}$:

When the current displacement $\Delta D$ (e.g. $\Delta D_1$ shown in FIG. 4) is smaller than the threshold TH, the processing unit 13 accumulates the current displacement $\Delta D_1$ to the accumulated displacement $\Sigma\Delta D$ (i.e. $0+\Delta D_1$) saved in the storage unit 16; meanwhile, the counting unit 16 counts an accumulated parameter C, which may be an accumulated number of the current displacement being accumulated (e.g. 1 by now) or an accumulation interval of accumulating the current displacement (e.g. 8 ms by now), to be saved in the storage unit 16; meanwhile, the processing unit 13 outputs a zero displacement to the output unit 14 and the output unit 14 sends the zero displacement to the external electronic device 9. The procedure then performs a next detection of displacement.

Next, the image sensor 12 successively captures images at the sampling frequency (Step $S_{11}$'); the processing unit 13 receives the images to accordingly calculate a next current displacement $\Delta D$ (Step $S_{12}$'), such as $\Delta D_2$ shown in FIG. 4. At this moment, the accumulated displacement $\Sigma\Delta D$ stored in the storage unit 16 may not be zero (e.g. $\Delta D_1$ by now). It is appreciated that in the steps $S_{11}$ and $S_{11}$' the same image sensor 12 is used to capture images; and in the steps $S_{12}$ and $S_{12}$' the same processing unit 12 is used to calculate the current displacement; and these steps are separated in FIG. 3 for clearly showing the procedure.

Step $S_{16}$:

The next current displacement $\Delta D_2$ is directly accumulated to the accumulated displacement $\Sigma\Delta D$ (e.g. $\Delta D_1+\Delta D_2$). The counting unit 15 continuously increases the counting parameter C. In other words, if the accumulated displacement $\Sigma\Delta D$ stored in the storage unit 16 is not zero, when the processing unit 13 obtains a new current displacement $\Delta D$, the processing unit 13 may directly accumulate the new current displacement $\Delta D$ to the accumulated displacement $\Sigma\Delta D$. The processing unit 13 does not compare the new current displacement $\Delta D$ with the threshold TH to determine whether to accumulate the current displacement $\Delta D$ or not.

Steps $S_{17}$~$S_{18}$:

The processing unit 13 compares the accumulated displacement $\Sigma\Delta D$ with the threshold TH and/or compares the accumulated parameter C with a predetermined accumulation value N. When the accumulated displacement $\Sigma\Delta D$ is larger than or equal to the threshold TH and/or the accumulated parameter C is larger than or equal to the predetermined accumulation value N, the processing unit 13 outputs the accumulated displacement $\Sigma\Delta D$ or an average displacement $Ave\Sigma\Delta D$ of the accumulated displacement $\Sigma\Delta D$. For example, the processing unit 13 may control the output unit 14 to output the accumulated displacement $\Sigma\Delta D$ for one time or to output the average displacement $Ave\Sigma\Delta D$ of the accumulated displacement $\Sigma\Delta D$ for several times. In another embodiment, the processing unit 13 may also compare the next current displacement $\Delta D_2$ with the threshold TH and output the accumulated displacement $\Sigma\Delta D$ or the average displacement $Ave\Sigma\Delta D$ of the accumulated displacement $\Sigma\Delta D$ when the next current displacement $\Delta D_2$ is larger than or equal to the threshold TH. In this embodiment, the processing unit 13 may determine an output time of outputting the average displacement $Ave\Sigma\Delta D$ according to the accumulated parameter C.

For example in the embodiment shown in FIG. 4, it is assumed that a current displacement $\Delta D_4$ or the accumulated displacement $\Sigma\Delta D=\Delta D_1+\Delta D_2+\Delta D_3+\Delta D_4$ is larger than or equal to the threshold TH and/or the accumulated parameter C at time $t_4$ is larger than or equal to the predetermined accumulation value N (e.g. N=4 or 32 ms). The processing unit 13 controls the output unit 14 to output the accumulated displacement $\Sigma\Delta D$ for one time at time $t_4$ or controls the output unit 14 to output an average displacement $Ave\Sigma\Delta D$ of the accumulated displacement $\Sigma\Delta D$ (e.g. $Ave\Sigma\Delta D=\Sigma\Delta D/4$) at time $t_4$, and further output (the average displacement Ave$\Sigma\Delta$D+current displacement $\Delta D_5$) at time $t_5$, and further output (the average displacement Ave$\Sigma\Delta$D+current displacement $\Delta D_6$) at time $t_6$, and further output (the average displacement Ave$\Sigma\Delta$D+current displacement $\Delta D_7$) at time $t_7$. More specifically, the processing unit 13 may output the average displacement Ave$\Sigma\Delta$D for several times according to the accumulated parameter C, and an accumulated number of the current displacement $\Delta$D being accumulated may be set as an output time of outputting the average displacement Ave$\Sigma\Delta$D. In other words, in FIG. 4 if the processing unit 13 outputs the accumulated displacement $\Sigma\Delta$D for one time, the procedure is returned to the Step $S_{11}$ at time $t_5$; however, if the processing unit 13 outputs the average displacement Ave$\Sigma\Delta$D for several times, the procedure is returned to the Step $S_{11}$ at time $t_8$. It should be mentioned that when the average displacement Ave$\Sigma\Delta$D is outputted for several times, within the period outputting the average displacement Ave$\Sigma\Delta$D, e.g. at time $t_5$~$t_7$ of FIG. 4, the locus smoothing method of FIG. 3 may not be performed and a current displacement $\Delta$D obtained may be directly added to the average displacement Ave$\Sigma\Delta$D and the summation thereof is directly outputted. After the average displacement Ave$\Sigma\Delta$D is all outputted, e.g. at time $t_8$ of FIG. 4, the locus smoothing method of the present embodiment is performed again. It is appreciated that, the output time of outputting the average displacement is not limited to the accumulated number, and it may be a fixed number of times or a multiple of the accumulated number without any limitation.

Step $S_{19}$:

When both of the next current displacement $\Delta D_2$ and the accumulated displacement $\Sigma\Delta$D are smaller than the threshold TH, and when the accumulated parameter C is smaller than the predetermined accumulation value N, the processing unit 13 outputs a zero displacement to the output unit 14 to be sent to the external electronic device 9 through the output unit 14, and the procedure is returned to the Step $S_{11}$' to calculate a next current displacement, e.g. $\Delta D_3$. Next, the Steps $S_{16}$, $S_{17}$ and $S_{19}$ are performed repeatedly till the current displacement $\Delta$D, the accumulated displacement $\Sigma\Delta$D and/or the accumulated parameter C satisfy the condition in the Step $S_{17}$ (as mentioned above), and then the accumulated displacement $\Sigma\Delta$D is outputted for one time or the average displacement Ave$\Sigma\Delta$D of the accumulated displacement $\Sigma\Delta$D is outputted for several times.

It should be mentioned that the step $S_{17}$ of FIG. 3 shows that the processing unit 13 may compare the next current displacement $\Delta$D with the threshold TH or compare the accumulated displacement $\Sigma\Delta$D with the threshold TH. It is known that when the next current displacement $\Delta$D is larger than or equal to the threshold TH, the accumulated displacement $\Sigma\Delta$D is naturally larger than or equal to the threshold TH. Therefore in step $S_{17}$, it is able to only compare the accumulated displacement $\Sigma\Delta$D with the threshold TH and it is not necessary to compare the next current displacement $\Delta$D with the threshold TH.

As mentioned above, conventional optical mouse may output zigzag locus in tiny displacement such that the operation accuracy may be degraded. Therefore, the present disclosure further provides an optical navigation device (FIGS. 2A and 2B) and a locus smoothing method thereof (FIG. 3) that may output a zero displacement when an accumulated displacement does not exceed a displacement threshold and an accumulated parameter does not exceed a predetermined accumulation value. The accumulated displacement is outputted for one time or an average displacement of the accumulated displacement is outputted for several times till the accumulated displacement exceeds the displacement threshold or the accumulated parameter exceeds the predetermined accumulation value. In the present disclosure, as the outputted displacement is relatively larger than the noise, it is able to eliminate the interference from the noise on tiny displacement.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device configured to be coupled to an external electronic device, the optical navigation device comprising:
   an image sensor configured to successively capture images;
   an output unit; and
   a processing unit coupled to the output unit and configured to
      calculate a current displacement according to the captured images and compare the current displacement with a threshold,
      when the current displacement is smaller than the threshold, output a zero displacement to the external electronic device via the output unit and accumulate the current displacement to an accumulated displacement, and
      when the current displacement is larger than or equal to the threshold, output the current displacement without accumulating the current displacement to the accumulated displacement.

2. The optical navigation device as claimed in claim 1, further comprising:
   a counting unit configured to count an accumulated number which is a number of times the current displacement being accumulated to the accumulated displacement.

3. The optical navigation device as claimed in claim 2, wherein the accumulated number is increased by 1 as long as one current displacement is accumulated to the accumulated displacement.

4. The optical navigation device as claimed in claim 2, wherein the processing unit is further configured to calculate an average displacement of the accumulated displacement when the accumulated number is larger than or equal to a predetermined accumulation value.

5. The optical navigation device as claimed in claim 4, wherein the average displacement is outputted for several times.

6. The optical navigation device as claimed in claim 5, wherein a number of times of outputting the average displacement is a multiple of the accumulated number.

7. The optical navigation device as claimed in claim 2, wherein the processing unit is further configured to output the accumulated displacement when the accumulated number is larger than or equal to a predetermined accumulation value.

8. The optical navigation device as claimed in claim 1, wherein the processing unit is further configured to calculate an average displacement of the accumulated displacement when the accumulated displacement is larger than or equal to the threshold.

9. The optical navigation device as claimed in claim 1, wherein the processing unit is further configured to output the accumulated displacement when the accumulated displacement is larger than or equal to the threshold.

10. The optical navigation device as claimed in claim 1, wherein the processing unit is further configured to directly accumulate a next current displacement to the accumulated displacement without comparing the next current displacement with the threshold when the current displacement is smaller than the threshold.

11. A locus smoothing method of an optical navigation device for smoothing displacements sent to an external electronic device, the optical navigation device comprising an image sensor, an output unit and a processing unit, the locus smoothing method comprising:
- successively capturing, by the image sensor, images;
- calculating, by the processing unit, a current displacement according to the captured images;
- comparing, by the processing unit, the current displacement with a threshold;
- when the current displacement is smaller than the threshold,
    - accumulating the current displacement to an accumulated displacement,
    - calculating, by the processing unit, a next current displacement, and
    - directly accumulating the next current displacement to the accumulated displacement;
- outputting the accumulated displacement to the external electronic device via the output unit when the accumulated displacement is larger than or equal to the threshold; and
- outputting a zero displacement to the external electronic device via the output unit when the accumulated displacement is smaller than the threshold.

12. The locus smoothing method as claimed in claim 11, wherein the optical navigation device further comprises a counting unit, and the locus smoothing method further comprises:
- counting, by the counting unit, an accumulated number which is a number of times current displacements being accumulated to the accumulated displacement.

13. The locus smoothing method as claimed in claim 12, wherein the accumulated number is only increased as long as one current displacement is accumulated to the accumulated displacement.

14. The locus smoothing method as claimed in claim 12, wherein when the current displacement is smaller than the threshold, the locus smoothing method further comprises:
- outputting the accumulated displacement or an average displacement of the accumulated displacement when the accumulated number is larger than or equal to a predetermined accumulation value.

15. The locus smoothing method as claimed in claim 14, further comprising:
- outputting the average displacement for a number of times of a multiple of the accumulated number.

16. A locus smoothing method of an optical navigation device for smoothing displacements sent to an external electronic device, the optical navigation device comprising an image sensor, an output unit and a processing unit, the locus smoothing method comprising:
- successively capturing, by the image sensor, images;
- calculating, by the processing unit, a current displacement according to the captured images;
- comparing, by the processing unit, the current displacement with a threshold;
- outputting the current displacement when the current displacement is larger than or equal to the threshold; and
- accumulating the current displacement to the accumulated displacement and outputting a zero displacement to the external electronic device via the output unit when the current displacement is smaller than the threshold.

17. The locus smoothing method as claimed in claim 16, wherein the optical navigation device further comprises a counting unit, and the locus smoothing method further comprises:
- counting, by the counting unit, an accumulated number which is a number of times the current displacement being accumulated to the accumulated displacement.

18. The locus smoothing method as claimed in claim 17, wherein when the current displacement is smaller than the threshold, the locus smoothing method further comprises:
- outputting the accumulated displacement for one time or outputting an average displacement of the accumulated displacement for several times when the accumulated number is larger than or equal to a predetermined accumulation value.

19. The locus smoothing method as claimed in claim 18, wherein a number of times of outputting the average displacement is determined according to the accumulated number.

20. The locus smoothing method as claimed in claim 16, wherein when the current displacement is smaller than the threshold, the locus smoothing method further comprises:
- calculating, by the processing unit, a next current displacement;
- directly accumulating the next current displacement to the accumulated displacement;
- comparing, by the processing unit, the accumulated displacement with the threshold; and
- outputting the accumulated displacement for one time or outputting an average displacement of the accumulated displacement for several times when the accumulated displacement is larger than or equal to the threshold.

* * * * *